US010747513B2

(12) United States Patent
Pan et al.

(10) Patent No.: US 10,747,513 B2
(45) Date of Patent: Aug. 18, 2020

(54) UTILIZING CREATED CHARACTER INDEX FOR SWITCH STATEMENTS

(71) Applicant: International Business Machines Corporation, Armonk, NY (US)

(72) Inventors: Xing Xing Pan, Shanghai (CN); Jiu Fu Guo, Shanghai (CN); Xiao Feng Guan, Shanghai (CN); Allan Kielstra, Ajax (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/247,668

(22) Filed: Jan. 15, 2019

(65) Prior Publication Data

US 2019/0146765 A1  May 16, 2019

Related U.S. Application Data

(63) Continuation of application No. 15/680,691, filed on Aug. 18, 2017, now Pat. No. 10,248,394.

(51) Int. Cl.
*G06F 9/44* (2018.01)
*G06F 8/41* (2018.01)
*G06F 16/903* (2019.01)
*G06F 16/901* (2019.01)
*G06F 7/00* (2006.01)
*G06F 9/451* (2018.01)

(52) U.S. Cl.
CPC .............. *G06F 8/443* (2013.01); *G06F 7/00* (2013.01); *G06F 16/901* (2019.01); *G06F 16/90344* (2019.01); *G06F 9/454* (2018.02)

(58) Field of Classification Search
None
See application file for complete search history.

(56) References Cited

U.S. PATENT DOCUMENTS

| 6,412,105 B1* | 6/2002 | Maslennikov | G06F 8/445 |
| | | | 717/151 |
| 8,387,003 B2 | 2/2013 | Darcy | |
| 9,298,467 B2* | 3/2016 | Jackson | G06F 9/3844 |
| 2004/0210886 A1* | 10/2004 | Jarp | G06F 8/4451 |
| | | | 717/159 |
| 2011/0099535 A1 | 4/2011 | Buckley et al. | |

(Continued)

OTHER PUBLICATIONS

Pan et al., "Utilizing Created Character Index for Switch Statements," U.S. Appl. No. 15/680,691, filed Aug. 18, 2017.

(Continued)

*Primary Examiner* — Qamrun Nahar
(74) *Attorney, Agent, or Firm* — Robert J. Shatto (57) ABSTRACT

Provided is a method for string comparison. The method includes receiving a plurality of target strings. Each target string of the plurality of target strings comprises a sequence of characters. The method further includes creating a character index for the plurality of target strings having a plurality of entries corresponding to the sequence of characters. The method further includes prioritizing the plurality of entries. The method further includes determining an evaluation method for the plurality of target strings based on the plurality of prioritized entries. The method further includes performing the evaluation method for the plurality of target strings.

20 Claims, 3 Drawing Sheets

(56) References Cited

U.S. PATENT DOCUMENTS

2015/0363177 A1* 12/2015 Shimamura ............. G06F 8/443
717/142

OTHER PUBLICATIONS

Pan et al., "Utilizing Created Character Index for Switch Statements," U.S. Appl. No. 15/815,484, filed Nov. 16, 2017.
Sayle, R., "A Superoptimizer Analysis of Multiway Branch Code Generation," https://www.nextmovesoftware.com/technology/SwitchOptimization.pdf, reprinted from the Proceedings of the GCC Developers' Summit, pp. 1-16, Jun. 17-19, 2008, Ottawa, Ontario, Canada.
Shen et al., "An LLVM-based Hybrid Binary Translation System," http://eeexplore.ieee.org/abstract/document/6356589, 7th IEEE International Symposium on Industrial Embedded Systems (SIES'12), pp. 229-236 © 2012 IEEE.
List of IBM Patents or Patent Applications Treated as Related, Dec. 13, 2018, 2 pgs.
Neumann et al., "Improving Switch Statement Performance with Hashing Optimized at Compile Time," http://programming.sirrida.de/hashsuper.pdf, 14 pgs, printed Aug. 8, 2017.

* cited by examiner

UTILIZING CREATED CHARACTER INDEX FOR SWITCH STATEMENTS

BACKGROUND

The present disclosure relates to data processing, and more specifically, to string comparison.

A batch of string comparisons is not rare in software program development. For example, in some programming languages, such as Java and COBOL, "switch" statements, "if-else-strcmp" statements, and "EVALUATE . . . WHEN" statements can be extended to support batch string comparison. Some programming languages have done some improvement over straightforward methods. For example, a hash function may be provided to improve a string comparison. A hash function is generally a procedure or mathematical function that maps a large, possibly variable-sized amount of data into a small datum, often a single integer, which may serve as an index to an array.

SUMMARY

Embodiments of the present disclosure include a method, computer program product, and system for string comparison. A plurality of target strings is received. Each target string of the plurality of target strings comprises a sequence of characters. A character index for the plurality of target strings having a plurality of entries corresponding to the sequence of characters is created. The plurality of entries are prioritized. An evaluation method for the plurality of target strings is determined based on the prioritized plurality of entries is determined. The evaluation method for the plurality of target strings is performed.

BRIEF DESCRIPTION OF THE DRAWINGS

Included herein is a detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it is to be understood that the disclosed embodiments are merely illustrative of the claimed structures and methods that may be embodied in various forms. Aspects of the present disclosure may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Some embodiments will be described in more detail with reference to the accompanying drawings, in which example embodiments of the present disclosure have been illustrated. However, the present disclosure can be implemented in various manners, and thus should not be construed to be limited to the embodiments disclosed herein.

In some programming languages like Java and COBOL, batch string comparison can be done within well-formatted grammar rules. For example, in Java 7, a switch statement is extended to support a string, such as:

```
switch (animal) {
    case "Cat": ...
    case "Python": ...
    case "Monkey": ...
    default: ...
}
```

And similarly in COBOL, the function EVALUATE STRING can also provide similar functionality, for example, by executing: WHEN "ABC" . . . . WHEN "DEF." In some cases, a switch statement can act like a sequential string comparison. For example, a "switch" statement can be executed as follows:

```
if (strncmp("Cat", animalString)) { ... }
    else if (strncmp("Python", animalString)) { ... }
    else if (strncmp("Monkey", animalString)) { ... }
else { ... }
```

Given "N" (where N is any positive whole number) target strings in a switch statement, on average, "N/2" string comparisons are needed to match an exact result. Consequentially, due to the high number of string comparisons needed to match the exact result, the performance may be poor since a compiler may not routinely perform optimization work on switch statements. Therefore, there is a long felt need for sequential string comparison to be improved in order to achieve higher runtime performance.

Therefore, it may be advantageous to provide a system and method for compilers to handle switch-strings statements efficiently by checking the differences of all strings at compiling time, and then converting strings into a limited number of integers, quickly. In accordance with embodiments of the present disclosure, a compiler could fully analyze target strings, and then provide a quicker string evaluation method from a pre-defined evaluation logic. Then using the evaluation method to convert strings into integers, the integers can be converted in to an action table to improve performance.

All strings may be collected in 'case' statements; for those strings, at each index, all characters at same index for all those strings may be collected. The characters in 'case' strings could be re-ordered (or re-prioritized) according the differences in the collected characters and can be eliminated if there are no differences between characters at any given index. An algorithm may be determined that converts the strings into integers, or that converts the strings into an action table. Additionally, in user source code, the strings in 'case' statements may be different sizes; embodiments of the present disclosure provide a method to convert the strings into a same length during string analysis.

Figure 1:
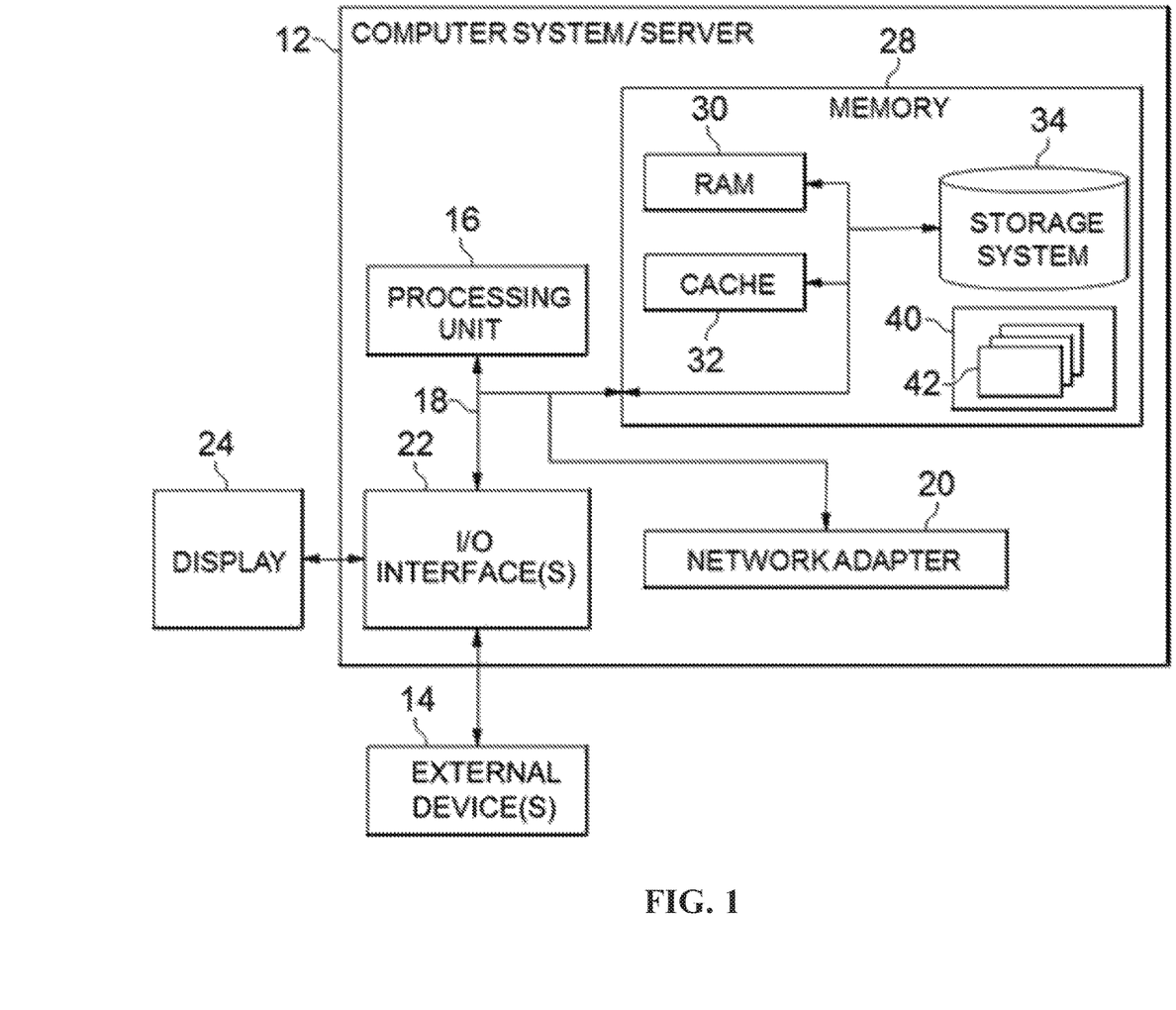
FIG. 1 illustrates a networked computer environment, according to at least one embodiment.

Referring now to FIG. 1, illustrated is an exemplary computer system/server 12 that is applicable to implement the embodiments of the present disclosure. FIG. 1 is also adapted to depict an illustrative example of a portable electronic device such as a communication device that is applicable to implement the embodiments of the present disclosure. Computer system/server 12 is only illustrative and is not intended to suggest any limitation as to the scope of use or functionality of embodiments of the disclosure described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 (e.g., a keyboard, a pointing device), a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to the following: microcode, device drivers, redundant processing units, external disk drive arrays, RAID systems, tape drives, and data archival storage systems, etc.

Figure 2:
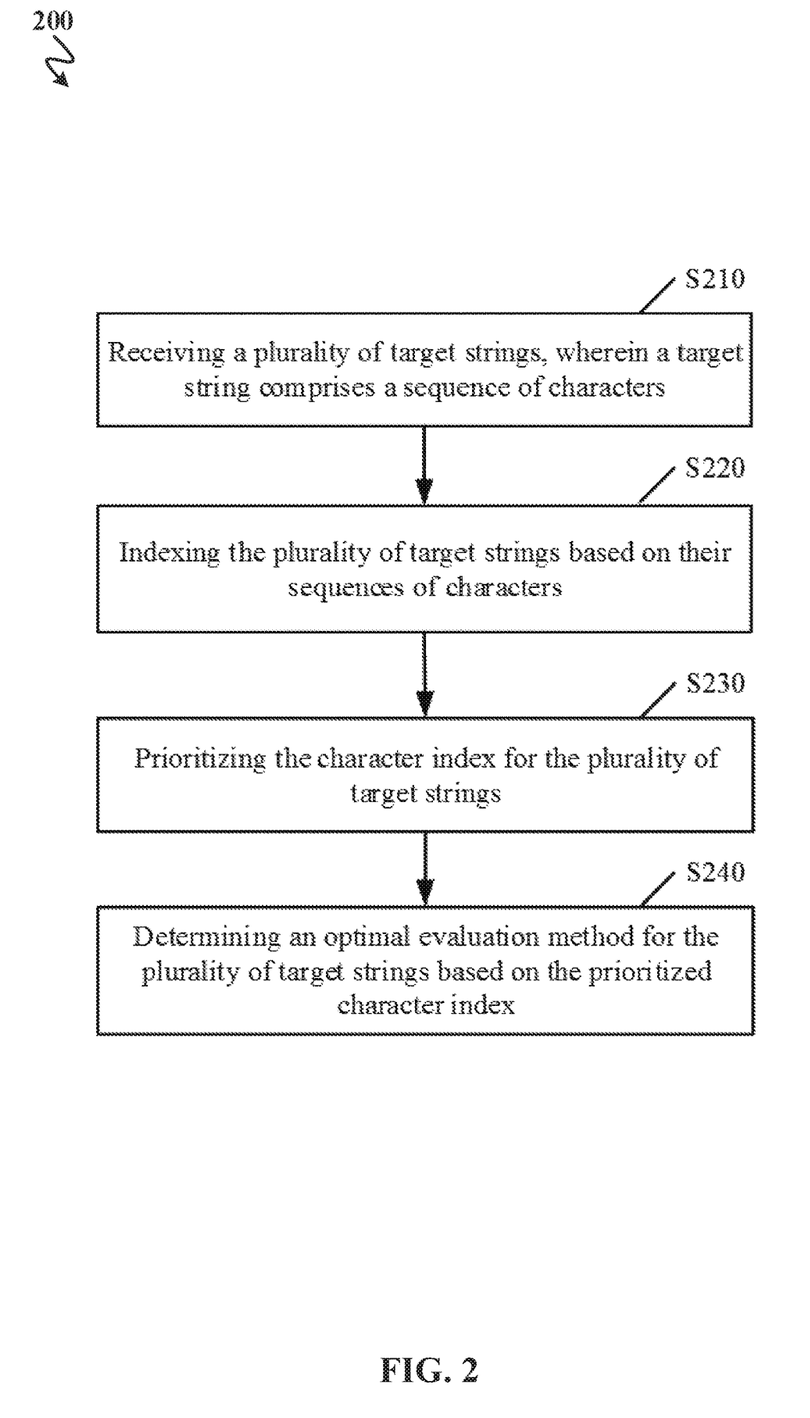
FIG. 2 illustrates an a schematic flowchart of the method for string comparison, according to at least one embodiment.

FIG. 2 shows a schematic flowchart of an example method 200 for performing a string comparison, according to an embodiment of the present disclosure. As discussed above, string comparison has been widely used in one or more programming languages. For example, many computer-programming languages include a language construct that may be viewed as a multi-way branch, in which the value of a run-time variable or expression may be compared with members of a set of constants. A branch selection may be made based on the result of the comparisons. Such constructs are often known as "switch statements."

In a typical switch statement, the run-time variable or expression, sometimes referred to as the "control variable" or "input control variable," may be tested against a set of case labels (or target strings). If the value of the control variable matches a case label, the program will execute a block of code associated with that case label. If the value of the control variable does not match that case label, the next case label may be examined and the process repeats until a match is found or until the given set of case labels is exhausted.

In some computer programming languages, a "break" keyword can be used to signal the end of a block of code, so that the process can exit the multi-branch construct. If no "break" keyword is present at the end of a block of code, the program execution may "fall-through" to the code associated with the next case label in the construct in some languages, as if its value also matches the control variable. In some other languages, the "fall-through" is not allowed. A "break" keyword is implicit and does not need to appear in the source code. Below is an example of "switch statement" in Java 7.

Sample Statement 1:

```
switch (incomingstring) {
    case "aaa": action1 ( ); break; //target string 1 is "aaa"
    case "aab": action2 ( ); break; //target string 2 is "aab"
    case "abkk": action3 ( ); break; //target string 3 is "abkk"
    case "abmm": action4 ( ); break; //target string 4 is "abmm"
    case "acyyy": action5 ( ); break; //target string 5 is "acyyy"
    case "aczzz": action6 ( ); break; //target string 6 is "aczzz"
default:
    action_default ( );
}
```

In the switch statement, the control variable, "incomingstring", is tested against six case labels (target strings), namely, "aaa", "aab", "abkk", "abmm", "acyyy" and "aczzz". These case labels are associated with their action codes, actions 1-6, respectively. If the control variable matches with any of the target strings, then the associated action code is executed. If none of the target strings is found matching, then the default action, action_default( ) will be executed.

In addition to switch statements, similar functionalities may be provided in other manners. For example, in COBOL, a statement such as, EVALUATE STRING WHEN "ABC" ... WHEN "DEF," can also provide similar functionality. Moreover, a batch of string comparisons may also be implemented in an "if-else-strcmp" statement, as illustrated below.

```
if (strncmp("Cat", animalString)) { ... }
    else if (strncmp("Python", animalString)) { ... }
    else if (strncmp("Monkey", animalString)) { ... }
    else {...}
```

In this statement, the input variable string (animal String) can be tested against a set of target strings, "Cat", "Python", "Monkey," etc. The method for string comparison under this embodiment may apply to any of these scenarios.

As shown in FIG. 2, the process of this embodiment 200 starts at step S210, where a plurality of target strings are received. The target strings may be received in the form of source code (e.g., a switch statement). Here, a target string comprises a sequence of characters. Although the examples of target and variable strings described in this disclosure include characters in English language, it is noted that a target or variable string may comprise a sequence of characters in any one or combination of languages, such as English, French, Spanish, German, Chinese, Japanese, etc. The characters can be encoded in any existing or future technologies, including, but not limited to, ASCII, Unicode, EBCDIC, CJK, UTF-8, UTF-16, UTF-32, GB18030, etc.

As discussed above, the target strings received at step S210 can be implemented as "case labels" strings in a "switch statement," The target strings may also be implemented in other forms, such as "if-else-strcmp" statement, COBOL EVALUATE ... WHEN statement, etc. The target strings are literal strings whose values are known at the stage of compiling. Once the source code pattern is recognized by the compiler, the target string literals are known to the system.

In the above sample statement 1, six target strings are received as "case labels" at step S210. They are "aaa", "aab", "abkk", "abmm", "acyyy" and "aczzz".

Then, the process 200 proceeds to step S220, where a character index can be created for the target strings having a plurality of entries corresponding to the sequences. The following Table 1 shows an example that the character index is created for the six target strings based on their sequences.

TABLE 1

Example of Character Index

| entry | character of target string 1 | character of target string 2 | character of target string 3 | character of target string 4 | character of target string 5 | character of target string 6 |
|---|---|---|---|---|---|---|
| 0 | "a" | "a" | "a" | "a" | "a" | "a" |
| 1 | "a" | "a" | "b" | "b" | "c" | "c" |
| 2 | "a" | "b" | "k" | "m" | "y" | "z" |
| 3 | | | "k" | "m" | "y" | "z" |
| 4 | | | | | "y" | "z" |

As shown in the above table, the character index is created as 0-4 according to their sequences. The entries of the character index 0-4 are "aaaaaa", "aabbcc", "abkmyz", "kmyz," and "yz", respectively.

At step S230, the entries can be prioritized. In this embodiment, diversity of the character values for each entry shows its ability to distinguish the target strings. Thus, the compiler analyzes the differences in the collected character values for each entry, and prioritizes the entries based on their diversities. An entry (e.g., row in Table 1) with greatest higher diversity of character values can be applied with highest priority, and vice versa.

According to this embodiment, firstly, the number of values (e.g., number of different characters) is obtained for each entry of the character index. Then, the entries are prioritized based on the numbers of values of the entries. Particularly, the number of values of each entry shows the diversity of the character values on the character index, which can be employed to distinguish the target strings. The more values an entry has, the more capable of distinguishing the target strings it is.

Specifically, for the above example, the following Table 2 shows the result after prioritization. As shown in table 2, the entry [2] is the most distinguishable entry and thus is assigned with the highest priority.

TABLE 2

| entry | character values of entries | number of values | priority |
|---|---|---|---|
| 0 | "a" | 1 | 5 |
| 1 | "a", "b", "c" | 3 | 3 |
| 2 | "a", "b", "k", "m", "y", "z" | 6 | 1 |
| 3 | "k", "m", "y", "z" | 4 | 2 |
| 4 | "y", "z" | 2 | 4 |

After the prioritization of step S230, the process 200 proceeds to step S240, where an evaluation method can be determined for the plurality of target strings based on the prioritized entries. In this embodiment, the evaluation method is the one having less runtime cost, such as, comparison or calculation.

For example, the compiler can select the entry of the character index with the highest priority. If the number of values of an entry is equal to the number of target strings, then the entry is sufficient to distinguish all target strings. This means that other entries are not needed. The evaluation method may be comparing the variable string against the target strings based on the entry having the highest priority. Thus, the compiler can translate the source code into efficient code based on the determined evaluation method.

Take the above switch statement as an example. The entry [2] of the character index, which is assigned with the highest priority, has six values. As there are only six target strings, the entry [2] itself can distinguish all the target strings. Thus, the compiler can translate the switch statement into more efficient code as follows.

```
switch (incomingString[2]) {
    case 'a': if(incomingString == "aaa") action1( );
        else action_default( ); break;
    case 'b': if(incomingString == "aab") action2( );
        else action_default( ); break;
    case 'k': if(incomingString == "abkk") action3( );
        else action_default( ); break;
    case 'm': if(incomingString == "abmm") action4( );
        else action_default( ); break;
    case 'y': if(incomingString == "acyyy") action5( );
        else action_default( ); break;
    case 'z': if(incomingString == "aczzz") action6( );
        else action_default( ); break;
    default: action_default( );
}
```

In the above example, after matching the character values of the entry [2], the whole incoming string is compared with the matched target string to further confirm that the incoming string is a real match; however, this is not necessary, for example, where the input variable does not go beyond the scope of the target strings.

It is possible that the entry of the character index, with the highest priority, cannot distinguish all the target strings. In this case, the process can proceed to further refine other entries. This can be done by removing the target strings that can be distinguished with the highest priority entry and repeating the steps of S230 and S240. These steps can be repeated until all target strings are removed.

Alternatively, if two or more target strings have the same character value at the entry after step S240, they can be classified into a subset. Then, steps S230 and S240 can be performed with respect to the subset and this process can be repeated until all of the target strings are distinguished.

Depending on the actual set of target strings, the evaluation method may comprise any one or combination of comparison based on an entry, comparison based on hash conversion, direct comparison, and other existing or future techniques. The comparison based on an entry has been illustrated above with the example. The direct comparison is a traditional sequentially string comparison. For example, the program can be configured to scan a target string from the first to the last character and compare the target string with the input variable string. When all characters are the same, it is determined that these strings are matched. In this way, it can be confirmed whether the incoming variable string is one of the target strings. The hash-based comparison is employed to map a target string to a distinct integer. The mapping can be implemented with an associate array. For example, existing hashing methods may include perfect-hashing method, minimal-perfect-hashing method, pre-defined method, etc.

Moreover, the compiler may use any one or combination of existing or future techniques for run-time evaluations, in order to improve the runtime efficiency. For a specific branch or subgroup of target strings as the steps of S230 and S240 are repeated, the evaluation method may be different.

As illustrated above, the method for string comparison according to the above embodiments of the present disclosure can analyze the target strings to be compared, which are literal strings with known values at the stage of compiling. In this way, the evaluation method for runtime comparison can be optimized. For example, the system may need to compare only certain entry or entries of the character index to complete the string comparison. The system may also use different evaluation methods for a different set or subset of target strings. This can significantly reduce runtime costs for string comparison and result in improved performance.

Furthermore, the target strings may have different lengths. In most programming language, accessing memory out of string boundary will cause unexpected behavior. Therefore, it is desirable to handle input strings when they have different lengths.

In an embodiment of the present disclosure, the target strings can be classified into a plurality of subgroups based on their lengths. Then, the operations of creating, prioritizing, and determining can be performed with respect to the subgroups of target strings. Specifically, a subgroup can comprise target strings with the same length. Then, above operations S230 and S240 can be performed with respect to each subgroup. As a result, all target strings can be differentiated.

Take the above switch statement as an example. The compiler can translate the source switch statement into more efficient code as follows.

```
int length = incomingString.length ( ); //or similar method to get string
length switch (length) {
    case 3:
        switch (incomingString){
            case "aaa": action1 ( ); break;
            case "aab": action2 ( ); break;
            default: action_default ( );
        }
        break;
    case 4:
        switch (incomingString) {
            case "abkk": action3 ( ); break;
            case "abmm": action4 ( ); break;
            default: action_default ( );
        }
        break;
    case 4:
        switch (incomingString) {
            case "acyyy": action5 ( ); break;
            case "aczzz": action6 ( ); break;
            default: action_default ( );
        }
        break;
default:
    action_default ( );
}
```

In another embodiment, the targets strings can also be padded with filling characters so that they have unified lengths. Particularly, for a shorter target string, a necessary number of filling characters can be added to its end, so that it will have the same length as the longest string. For example, the filling character may comprise a certain less-used visible character, like "#," or invisible character, like "\0."

Further, a prefix can also be added to each target string, wherein the prefix indicates the original length of the target string. An exemplary code for this method is generated as follows.

```
// padding is some predefined character
    #define P "\0"
    int length = incomingString.length ( );
    if (length > 5 \\ length < 3 {action_default ( ); }
        else {
            uniqueLengthString = length + incomingString;
            if (length < 4) uniqueLengthString = incomingString + P;
            if (length < 5) uniqueLengthString = incomingString + P;
        }
    switch (uniqueLengthString) {
        case "aaa"PP:            action1 ( ); break;
        case "aab"PP:            action2 ( ); break;
        case "abkk"P:            action3 ( ); break;
        case "abmm"P:            action4 ( ); break;
        case "acyyy": action5 ( ); break;
        case "aczzz": action6 ( ); break;
    default: action_default ( );
    }
```

According to another embodiment, when determining the evaluation method, the compiler can use certain statistical data for assessment. For example, the existing Java Virtual Machine (JVM) and Just-In-Time (JIT) compiler can help collect runtime data. With the collected profiling information, the compiler (e.g., JIT) can be configured to use this information to assess the candidate methods or techniques and, thus, choose one or a combination of them, which would have less runtime costs, as the evaluation method.

According to another embodiment, an action table can be generated to further improve the performance. An entry of the action table comprises the starting address of an action code associated with a specific outcome of the string comparison.

Take the above switch statement as an example. The entry [2] of the character index, which is assigned with the highest priority, has six values. As there are only six target strings, the entry [2] itself can distinguish all the target strings. Thus, the compiler can generate an action table as follows.

```
#define BASE 'a' // some base value which benefits most
void * action_table[big_size];
action_table['a' - BASE] = &action1;
action_table['b' - BASE] = &action2;
action_table['k' - BASE] = &action3;
action_table['m' - BASE] = &action4;
action_table['y' - BASE] = &action5;
action_table['z' - BASE] = &action6;
if (incomingString.length( ) < 3 \\ incomingString.length( ) > 5)
    action_default( );
else
    goto action_table[incomingString[2]];
```

As discussed above, it is possible that one entry of the character index may not be sufficient to distinguish all the target strings. Multiple level branches of comparison may be used to obtain the final result. However, when there are too many levels, the runtime costs for multiple level branches comparison may also be significant. According to an embodiment, hashing comparison can be used to avoid deep multiple level branches. For example, only those target strings that cannot be distinguished by the entry of the character index are converted into integers. As discussed above, the hash-based comparison maps a target string to a distinct integer. The mapping can be implemented with an associate array. For example, existing hashing methods may include a perfect-hashing method, a minimal-perfect-hashing method, a pre-defined method, etc. In this way, a better runtime performance can be achieved by taking advantage of the entry comparison and hashing comparison.

According to another embodiment, during the runtime, a variable string can be received, and the determined evaluation method can be performed with respect to the variable string. As discussed above, the evaluation method may comprise any one or combination of a comparison based on an entry of a character index, a comparison based on hash conversion, a direct comparison, and other existing or future techniques.

Figure 3:
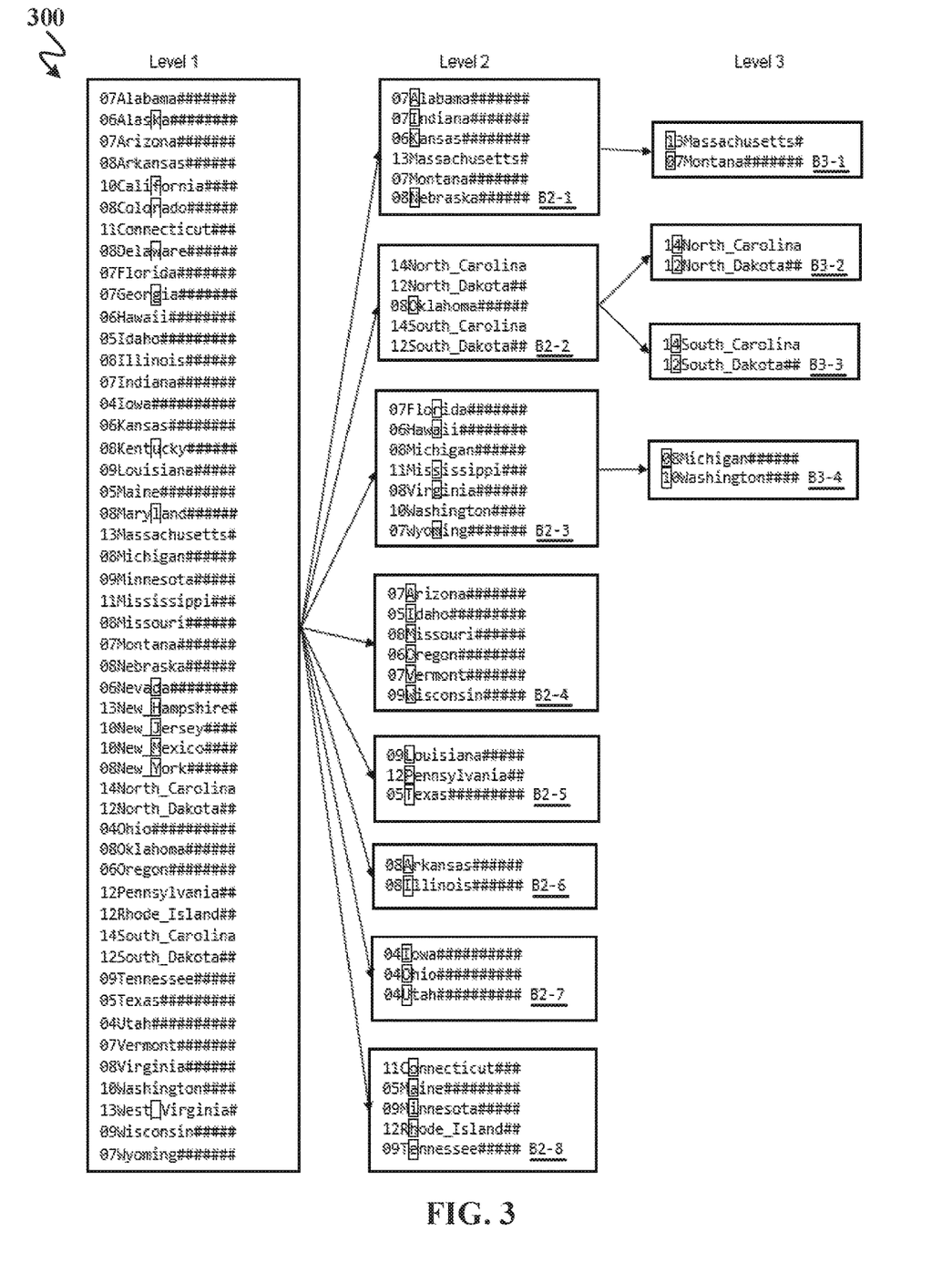
FIG. 3 illustrates an example diagram of the string comparison in which the method shown in FIG. 2 is implemented, according to at least one embodiment.

FIG. 3 shows an example of the string comparison, to which the method according to an embodiment is performed. As shown in FIG. 3, at level 1, the target strings, comprising the names of the fifty states of the United States, are received. As the target strings have different lengths, they are transformed into strings of the same length, by adding prefix and suffix data as described above.

In this example, the shorter target strings are padded with "#" at the end. Specifically, the longest target strings have a length of 14, which are North_Carolina and South_Carolina. For example, the string "Delaware" has eight characters and, thus, is padded with six "#"s at the end. Further, the original length of a target string is added to it as a prefix. For example, the string "Texas" is added with "05" at the beginning. After this, each target string has a total length of 16, as shown at level 1.

Then, a character index is created for each target string as 0 to 15 (for a total length of 16) based on its sequences. The entries of the character index are determined. The number of character values is obtained for each entry of the character index. The entries are prioritized according to the number of character values of the entries. The following Table 3 shows the results after these steps.

TABLE 3

| entry | character values of entries | number of values | priority |
|---|---|---|---|
| 0 | "0", "1" | 2 | 9 |
| 1 | "0", "1", "2", "3", "4", "5", "6", "7", "8", "9" | 10 | 6 |
| 2 | "A", "C", "D", "F", "G", "H", "I", "K", "L", "M", "N", "O", "P", "R", "S", "T", "U", "V", "W" | 19 | 2 |
| 3 | "a", "d", "e", "h", "i", "k", "l", "n", "o", "r", "t", "y" | 12 | 5 |
| 4 | "a", "b", "c", "d", "e", "i", "k", "l", "n", "o", "r", "s", "u", "v", "w", "x" | 16 | 3 |
| 5 | "a", "b", "c", "d", "g", "h", "i", "m", "n", "o", "r", "s", "t", "y", "z", "_" | 16 | 3 |
| 6 | "a", "d", "e", "f", "g", "h", "H", "i", "J", "k", "l", "M", "n", "o", "r", "s", "u", "w", "Y", "_", "#" | 21 | 1 |
| 7 | "a", "c", "d", "e", "g", "i", "m", "n", "o", "s", "u", "V", "y", "_", "#" | 15 | 4 |
| 8 | "a", "C", "d", "D", "g", "h", "i", "l", "k", "l", "m", "n", "o", "r", "s", "t", "x", "y", "#" | 19 | 2 |
| 9 | "a", "d", "e", "i", "k", "l", "n", "o", "p", "r", "s", "t", "u", "v", "y", "#" | 15 | 4 |
| 10 | "a", "c", "e", "i", "k", "l", "n", "o", "p", "r", "s", "#" | 12 | 5 |
| 11 | "a", "e", "h", "i", "n", "o", "p", "u", "y", "#" | 10 | 6 |
| 12 | "i", "l", "n", "t", "#" | 5 | 8 |
| 13 | "a", "d", "i", "r", "t", "#" | 6 | 7 |
| 14 | "a", "e", "n", "s", "#" | 5 | 8 |
| 15 | "a", "#" | 2 | 9 |

As shown in Table 3, the entry [6] of the character index has 21 character values, which is the most distinguishable entry. Therefore, the entry [6] is assigned with the highest priority. Through the entry [6], some character values are only present in one target string. They are marked with boxes under level 1. For example, "k" is present at the entry [6] only in the string "06Alaska########". No other target strings have "k" at the entry [6]. In other words, when receiving a variable string with "k" at its entry [6], the outcome would be either be a match with the target string "Alaska" or no match.

In addition to "Alaska," there are twelve other target strings, which can be distinguished based on the entry [6]. Specifically, these character values of the entry are "f" for "10California####", "r" for "08Colorado######", "w" for "08Delawre######", "g" for "07Georgia#######", "u" for "08Kentucky######", "l" for "08Maryland######", "d" for "06Nevada########", "H" for "13New Hampshire#", "J" for "10New Jersey####", "M" for "10New Mexico####", "Y" for "08New York######", and "_" for "13West Virginia#", as shown under level 1. In total, thirteen target strings are distinguishable by one-time comparison based on the entry [6].

In this embodiment, the length of a string can be encoded as two characters, which are "0 to 1," and "0 to 9." However, embodiments of the present disclosure are not limited to this approach. For example, in some embodiments, unreadable characters can be used to encode the length of a string. Taking the above example, "\05" to "\16" of ASCII can be used to represent the lengths of the target strings. Thus, the prefix may have only one character. This can save one character comparison.

At level 2, as shown in FIG. 3, the distinguished thirteen target strings are removed from the string list. The remaining 37 target strings are divided into eight subsets (subgroups) based on eight character values at the entry [6].

For example, the target strings with "a" at the entry [6] are classified into B2-1. The target strings with "h" are classified into B2-2; the strings with "i" are classified into B2-3; the target strings with "o" are classified into B2-4; the strings with "s" are classified into B2-5; the target strings with "n" are classified into B2-6; the strings with "#" are classified into B2-7; and the target strings with "e" are classified into B2-8.

For each subgroup, the prioritization can be performed again. For example, in B2-1, the entries [3], [4], [5], [6] and [8] are prioritized with the highest priority, since they all have five character values. The entry [3] is chosen for the following comparison. In this way, four strings (out of the six total in B2-1) can be distinguished using entry [3]. There are two target strings left with the same "M" at the index [3]. They are "13Massachusetts#" and "07Montana#######". Similarly, this operation can be applied to the other seven subsets under level 2. As a result, 29 strings can be distinguished by the second round of comparison. In addition to the 13 strings distinguished at level one, 42 of the 50 total states can be distinguished in two rounds.

At the third level, shown in FIG. 3, the distinguished 29 target strings are removed from the string list. The same process can be applied to the remaining eight target strings to easily distinguish them.

In average, it only needs 1.9 rounds of comparison based on the entries of the character index, $(13\times1+29\times2+8\times3)/50=1.9$, to test an input variable string. This is more efficient than existing solutions.

Under the same inventive concept, another embodiment of the disclosure can provide a computer system for string comparison. The computer system can comprise one or more processors, a memory coupled to at least one of the processors, and a set of computer program instructions stored in the memory and executed by at least one of the processors. The set of computer program instructions when executed perform the methods described herein. For example, the computer program instructions may cause the processor to perform a method comprising receiving a plurality of target strings, wherein a target string comprises a sequence of characters, creating a character index for the target strings having a plurality of entries corresponding to the sequences, prioritizing the entries, and determining an evaluation method for the plurality of target strings based on the prioritized entries.

Specifically, the computer system of the embodiment can be implemented with computer system/server 12 shown in FIG. 1. The processors can be implemented as Processing Unit 16 and the memory can be implemented as Memory 28.

Under the same inventive concept, another embodiment of the disclosure can provide a computer program product for string comparison. The computer program product may comprise a computer readable storage medium having program instructions embodied therewith. The program instructions may be executable by a processor to cause the processor to perform a method as described herein. For example, the program instructions may include instructions to cause a processor to receive a plurality of target strings, wherein a target string comprises a sequence of characters, create a character index for the target strings having a plurality of entries corresponding to the sequences, prioritize the entries, and then determine an evaluation method for the plurality of target strings based on the prioritized entries.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving, by a compiler, a conditional statement having a plurality of target strings, each target string having a sequence of characters;
analyzing, by the compiler, the plurality of target strings to determine an evaluation method for the conditional statement, wherein the determined evaluation method is based at least in part on a diversity of character values in the sequence of characters; and
translating, by the compiler, the conditional statement based on the determined evaluation method.

2. The method of claim 1, wherein analyzing the plurality of target strings to determine the evaluation method for the conditional statement includes:
creating a character index for the conditional statement, the character index having a plurality of entries corresponding to the sequence of characters;
prioritizing the plurality of entries according to a number of different values in each entry; and
determining the evaluation method for the conditional statement based on the prioritized plurality of entries.

3. The method of claim 2, further comprising:
classifying the plurality of target strings into a plurality of subgroups based on their lengths, wherein the creating the character index, prioritizing the entries, and determining the evaluation method are performed with respect to the plurality of subgroups of each target string of the plurality of target strings.

4. The method of claim 2, further comprising:
padding at least a subset of the plurality of target strings so that each target string has a unified length.

5. The method of claim 4, further comprising:
performing the evaluation method;
obtaining a subset of the plurality of target strings in response to performing the evaluation method, wherein prioritizing the plurality of entries and determining the evaluation method are repeated with respect to the subset of target strings; and
generating an action table including an action for each possible outcome of the evaluation method.

6. The method of claim 2, further comprising:
adding a prefix to each target string, wherein the prefix indicates an original length of each respective target string.

7. The method of claim 2, further comprising:
receiving a variable string; and
performing the evaluation method for the variable string.

8. The method of claim 7, wherein the performed evaluation method is selected from the group consisting of:
comparison based on an entry of the created character index;
comparison based on a hash conversion; and
direct comparison.

9. A computer system, comprising:
a memory; and
a processor communicatively coupled to the memory, wherein the processor is configured to perform a method comprising:
receiving, by a compiler, a conditional statement having a plurality of target strings, each target string having a sequence of characters;

analyzing, by the compiler, the plurality of target strings to determine an evaluation method for the conditional statement, wherein the determined evaluation method is based at least in part on a diversity of character values in the sequence of characters; and translating, by the compiler, the conditional statement based on the determined evaluation method.

10. The system of claim 9, wherein analyzing the plurality of target strings to determine the evaluation method for the conditional statement includes:

creating a character index for the conditional statement, the character index having a plurality of entries corresponding to the sequence of characters;

prioritizing the plurality of entries according to a number of different values in each entry; and determining the evaluation method for the conditional statement based on the prioritized plurality of entries.

11. The system of claim 10, wherein the method performed by the processor further comprises:

classifying the plurality of target strings into a plurality of subgroups based on their lengths, wherein the creating the character index, prioritizing the entries, and determining the evaluation method are performed with respect to the plurality of subgroups of each target string of the plurality of target strings.

12. The system of claim 10, wherein the method performed by the processor further comprises:

padding at least a subset of the plurality of target strings so that each target string has a unified length.

13. The system of claim 12, wherein the method performed by the processor further comprises:

performing the evaluation method;

obtaining a subset of the plurality of target strings in response to performing the evaluation method, wherein prioritizing the plurality of entries and determining the evaluation method are repeated with respect to the subset of target strings; and generating an action table including an action for each possible outcome of the evaluation method.

14. The system of claim 10, wherein the method performed by the processor further comprises:

adding a prefix to each target string, wherein the prefix indicates an original length of each respective target string.

15. The system of claim 10, wherein the method performed by the processor further comprises:

receiving a variable string; and performing the evaluation method for the variable string.

16. A computer program product, the computer program product comprising:

one or more computer-readable storage medium and program instructions stored on at least one of the one or more computer-readable storage medium, the program instructions executable by a processor to perform a method comprising:

receiving a conditional statement having a plurality of target strings, each target string having a sequence of characters;

analyzing the plurality of target strings to determine an evaluation method for the conditional statement, wherein the determined evaluation method is based at least in part on a diversity of character values in the sequence of characters; and translating the conditional statement based on the determined evaluation method.

17. The computer program product of claim 16, wherein analyzing the plurality of target strings to determine the evaluation method for the conditional statement includes:

creating a character index for the conditional statement, the character index having a plurality of entries corresponding to the sequence of characters;

prioritizing the plurality of entries according to a number of different values in each entry; and determining the evaluation method for the conditional statement based on the prioritized plurality of entries.

18. The computer program product of claim 16, wherein the method performed by the processor further comprises:

performing the evaluation method with respect to the plurality of target strings.

19. The computer program product of claim 18, wherein the method performed by the processor further comprises:

obtaining a subset of the plurality of target strings in response to performing the evaluation method, wherein prioritizing the plurality of entries and determining the evaluation method are repeated with respect to the subset of target strings;

generating an action table including an action for each possible outcome of the evaluation method; and receiving a variable string, wherein the performed evaluation method is performed with respect to the variable string.

20. The computer program product of claim 16, wherein the method performed by the processor further comprises generating an action table that includes an action for each possible outcome of the evaluation method.

* * * * *